United States Patent
Smith et al.

(10) Patent No.: US 10,051,850 B1
(45) Date of Patent: *Aug. 21, 2018

(54) APPARATUS AND METHODS FOR ELECTROFISHING

(71) Applicant: Smith-Root, Inc., Vancouver, WA (US)

(72) Inventors: Jeffery Z. Smith, Vancouver, WA (US); Joseph Curtis Edmondson, Beaverton, OR (US)

( * ) Notice: Subject to any disclaimer, the term of this patent is extended or adjusted under 35 U.S.C. 154(b) by 174 days.

This patent is subject to a terminal disclaimer.

(21) Appl. No.: 14/083,400

(22) Filed: Nov. 18, 2013

(51) Int. Cl.
*A01K 69/00* (2006.01)
*A01K 99/00* (2006.01)

(52) U.S. Cl.
CPC .................... *A01K 99/00* (2013.01)

(58) Field of Classification Search
CPC ...... A01K 79/02; A01K 97/12; A01K 97/125; A01K 99/00
USPC ............ 43/4, 4.5, 17.1; 119/200, 220; 231/7
See application file for complete search history.

(56) References Cited

U.S. PATENT DOCUMENTS

| | | | |
|---|---|---|---|
| 3,110,978 A | 11/1963 | Kreutzer | |
| 4,417,301 A | 11/1983 | Newman | |
| 4,750,451 A | 6/1988 | Smith | |
| 5,111,379 A | 5/1992 | Sharber | |
| 5,214,873 A | 6/1993 | Sharber | |
| 5,233,782 A | 8/1993 | Sharber | |
| 5,270,912 A | 12/1993 | Sharber | |
| 5,305,711 A | 4/1994 | Sharber | |
| 5,311,694 A | 5/1994 | Sharber | |
| 5,327,668 A | 7/1994 | Sharber | |
| 5,341,764 A | 8/1994 | Sharber | |
| 5,327,854 A | 10/1994 | Smith | |
| 5,445,111 A | 8/1995 | Smith | |
| 5,511,335 A * | 4/1996 | Langer | A01K 79/02 43/17.1 |
| 5,551,377 A | 9/1996 | Sharber | |
| 5,778,591 A | 7/1998 | Oschman et al. | |
| 5,782,033 A | 7/1998 | Park et al. | |
| 6,389,735 B1 * | 5/2002 | Holt | 43/17.1 |
| 6,978,734 B1 | 12/2005 | Smith | |
| 7,174,668 B2 | 2/2007 | Locklear | |
| 7,333,395 B2 | 2/2008 | Lewis et al. | |
| 7,905,440 B2 | 3/2011 | Ikuta et al. | |
| 2003/0051674 A1 | 3/2003 | Leblanc | |
| 2007/0020798 A1 | 9/2007 | Davidson | |
| 2009/0025270 A1 | 1/2009 | Orchard | |
| 2010/0313820 A1 | 12/2010 | Holliman | |

* cited by examiner

*Primary Examiner* — Tien Q Dinh
*Assistant Examiner* — George Andonyan
(74) *Attorney, Agent, or Firm* — J. Curtis Edmondson; Anitha Shankar Narayan; Law Offices of J. Curtis Edmondson (57) ABSTRACT

An improved electrofishing apparatus incorporates a system for generating the power transfer for a targeted fish species, a method for monitoring the power output of the electrofishing apparatus; a system to adjust the voltage, current, and frequency settings of the pulsator in the electrofisher in response to conductivity and temperature measurements.

7 Claims, 7 Drawing Sheets

APPARATUS AND METHODS FOR ELECTROFISHING

RELATED APPLICATIONS

This application claims the benefit of U.S. application Ser. No. 13/111,916 filed on May 19, 2011, the contents herein incorporated by reference, which is now abandoned; that application further claims the priority of U.S. provisional application No. 61/346,834, filed on May 20, 2010, the contents herein incorporated into this application by reference; and U.S. provisional application No. 61/357,867, filed on Jun. 23, 2010, the contents herein incorporated into this application by reference.

BACKGROUND

The present inventive subject matter relates to the apparatus and methods for electrofishing in general and for a modifiable portable ("backpack") electrofisher in particular.

Electrofishing

The protection and preservation of natural resources includes the management of fish and game. Fish move about lakes, rivers, streams and reservoirs for a variety of reasons, including migration, spawning, and searching for food. Therefore fishery biologists have relied on a number of tools to determine the number of fish in a lake or stream. These techniques include using nets, hook and line fishing, sonar imaging, snorkel counting, and/or electrofishing. Electrofishing is a popular technique in aiding the fisheries biologist in capturing fish for study.

There are many uses for electrofishing which are carried out to the extent the equipment available permits and without inducing an unacceptable mortality rate. Electrofishing permits the capture and removal of fish population from one locality to another. It permits surveys or population estimates to determine the type and number of fish present and their size range. Such estimates may also uncover natural fluctuations in population and assess the impact of channelization. Electrofishing permits guiding the movement of fish such as keeping predators away from freshly planted fry, keeping fish away from electric power plant water intakes, keeping migrating fish away from specific areas en route and trapping fish (such as the sea lampreys in the Great Lakes). Biological sampling may be accomplished through electrofishing to collect brood stock, determine species composition, tabulate size and age characteristics. Food habits can be determined by collecting fish at feeding areas. Tagging and marking studies are readily carried out by acquiring fish by electrofishing, provided that the stresses of handling and shocking do not injure or kill too large a percentage. The prospect of injury and death is of particular concern when one is dealing with endangered species of fish.

Apparatus and techniques of electrofishing are the subject of U.S. Pat. Nos. 5,445,111; 5,327,854; 4,672,967; 4,713,315; 5,111,379; 5,233,782; 5,270,912; 5,305,711; 5,311,694; 5,327,668; 5,341,764; 5,551,377; and 6,978,734 which are incorporated herein by reference. Furthermore, techniques of electrofishing and the results of electrofishing have been described in numerous journals.

Electrofishing and Fish Physiology

The fish's body acts as a "voltage divider" when swimming through fresh water, and the gradient of an electrical field in the body of a fish will typically be less than the voltage gradient in the same space filled by fresh water. That is, the voltage gradient is altered in a region proximate a fish in the zone of an electrofisher. The voltage gradient across the body of a fish will be roughly proportional to the voltage gradient in the same region of fresh water when no fish are present. Accordingly, if the voltage gradient in a region of water is doubled, the voltage gradient across the fish (and the electrical current through the fish) will also double.

The effectiveness of an electric fish barrier on a particular fish, therefore, depends on the voltage field gradient produced by the electric fish barrier. The maximum transfer of energy from water to a fish occurs when the fish's electrical conductivity matches the electrical conductivity of the surrounding water.

The physiological reaction in the fish is dependent on the voltage gradients across the body of the fish. If a voltage gradient in a region of water is too weak, the fish will not feel appreciable discomfort, and will travel undaunted by the electric fish barrier. An "annoying region" will cause a fish to turn around and travel the preferred route.

The current passing through a fish generated by an electrofisher depends on a variety of factors such as the conductivity of the water at both ends of the fish, the total resistance in a conductive path of water, and the size and species of a fish.

During electrofishing with pulsed DC electric current, a fish will enter into a number of physiological states, depending upon the field strength or density in which it finds itself and upon the frequency, shape and width of the pulses. Five of the prominent physiological states are: (1) frightening the fish; (2) electrotaxis, the involuntary exercise of swimming muscles to draw the fish toward the source of electric current; (3) narcosis, when the fish muscles go limp and the fish rolls on its side which facilitates netting and acquisition of the fish; (4) is tetanus which is an involuntary contraction of the muscles without interleaved relaxation and that can result in death; (5) a reaction can occur if the white muscles of the fish are stimulated to the point of an epileptic seizure, thereby causing morphological trauma.

In normal electrofishing practice, direct current or pulsed direct currents are used because aquatic animals will move, in general, to the anode electrode. In the case of fish, this movement, (e.g. electrotaxis), involves a pseudo swimming reaction. As a fish approaches the anode electrode, it encounters an increasing field strength. At some critical value of field strength, depending upon many physical factors (e.g. water conductivity, fish health, etc) the fish may cease electrotaxis action, then enter a state of narcosis, and then a state of tetanus. Often, the critical state occurs a few feet from the anode electrode or very near it. In either case, the fish almost always drifts near to or may actually touch the anode electrode. The field strength within this zone causing tetanus is very high and a significant flow of electric current through the fish occurs. This electric current is generally believed to stimulate and then overwhelm the neuromuscular system of the fish. It is believed that the overwhelmed neuromuscular system causes the above referenced trauma.

SUMMARY

The present inventive subject matter overcomes problems in the prior art by providing methods that operationally modify the operating parameters of an electrofisher to improve the electrofishing of sampled fish. These methods have the steps of selecting a target fish species that approximates an actual fish species in the water allowing the target fish species and target fish size to be entered into a monitoring system calculating the target power transfer needed to induce a physiological state in a target fish species; calculating the current, voltage, and frequency, in a pulsator, that is required to generate a calculated power between an anode and a cathode to induce the physiological state in a sampled fish; monitoring with a monitoring system an electric field, a conductivity, and a temperature between the anode and the cathode to generate an actual power transferred in the water proximate to the sampled fish; determining difference between the calculated power and the actual power, the difference being used to adjust the current, voltage, and frequency of the pulsator; so that the power transfer to the sampled fish is optimized.

The improved method also involves the modification of the operating parameters of an electrofisher to improve electrofishing by determining the distance from the anode and the cathode to the sampled fish and then reducing the power transfer to avoid a change in the physiological state of the sampled fish.

The improved method of operationally modifying the operating parameters of an electrofisher also includes determining if the physiological change is electrotaxis, narcosis, tetanus, or death.

The improved method of operationally modifying the operating parameters of an electrofisher also includes a method of determining if the distance is determined by a camera.

The improved method of operationally modifying the operating parameters of an electrofisher also allows for measurement of the electric field, the conductivity, and the temperature with physical probes located proximate to the anode.

The foregoing is not intended to be an exhaustive list of embodiments and features of the present inventive subject matter. Persons skilled in the art are capable of appreciating other embodiments and features from the following detailed description in conjunction with the drawings.

DETAILED DESCRIPTION

Representative embodiments according to the inventive subject matter are shown in FIGS. 1-7, wherein similar features share common reference numerals.

Figure 1:
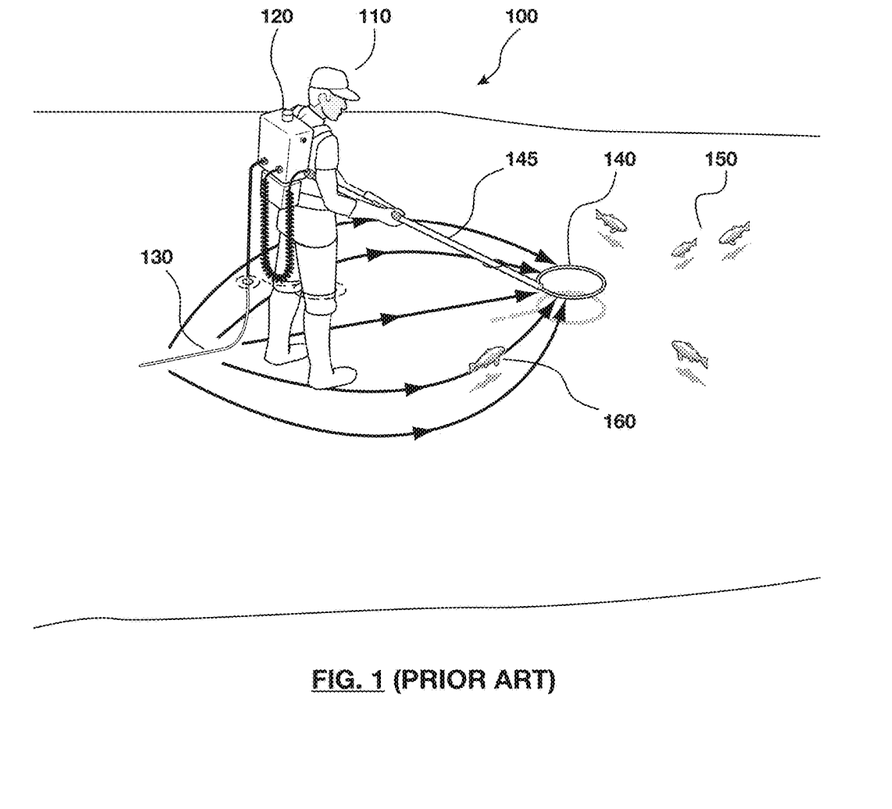
FIG. 1 is a prior art diagram of the use of a mobile electrofisher.

Now referring to FIG. 1 which shows the prior art system view 100 of a mobile electrofisher in the operational environment (e.g. a stream, river, brook, lake, etc). The operator 110 carries the mobile electrofisher 120. Connected to the mobile electrofisher is an external rat-tail cathode 130 and anode ring 140. The anode ring 140 is mounted to a non-conductive anode pole 145 which is held by the operator 110. While the system is energized (i.e. operational), a potential difference appears between the anode ring 140 and the rat-tail cathode 130. The potential difference causes a current to flow 160 in the water affecting fish 150.

Figure 2:
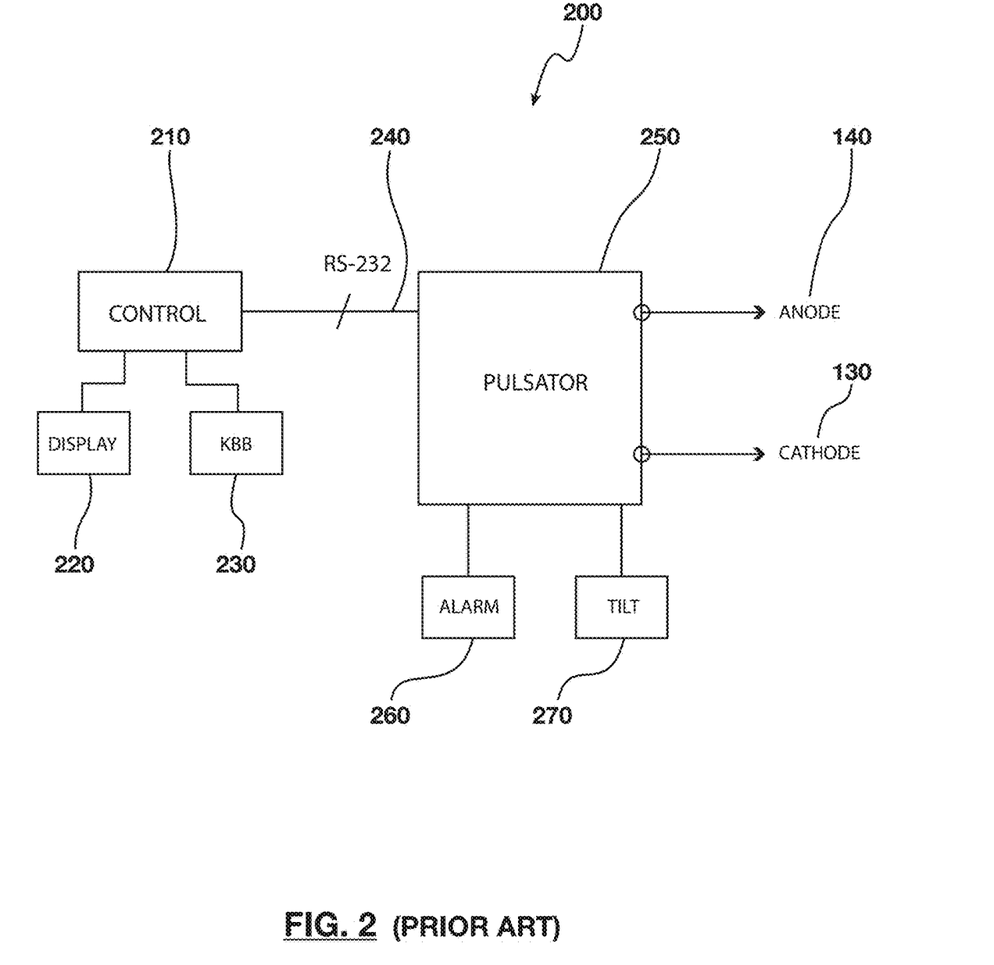
FIG. 2 is a prior art system diagram of the mobile electrofisher.

Now referring to FIG. 2 which depicts a prior art functional block diagram view 200 of the mobile electrofisher 120. The pulsator 250 generates the potential difference between the anode 140 and the cathode 130. The operational parameters of the pulsator 250 are modified by the controller 210 which can be manipulated by a keyboard 230 and display 220 interface. The interface between the controller 210 and the pulsator 250 is typically an RS-232 interface 240, but, it is well known to those skilled in the arts that any type of communication interface may be utilized including, but not limited to, USB, Firewire, ethernet, etc.

Also connected to the pulsator 250 are devices that monitor the state of the pulsator, including, but not limited to tilt sensors 270. Those skilled in the arts will recognize that other safety sensors, such as, a "kill switch" and/or a water detector, may be implemented.

The operating parameters of the pulsator 250 are well known to those skilled in the arts. Typical operating parameters include an input power source of 12-24 volts DC (usually powered by lead-acid batteries); an internal power conversion circuit that then converts the 12-24 volts dc to 300-800 volts dc This high voltage DC output is then fed to the anode 140 and the cathode 130. The high voltage DC output is also modified by a pulse shaping circuit that creates a modified waveform. This modified waveform may be an adjustable duty cycle DC output; a modified or clipped sine wave, a decaying exponential wave, or a pulsed DC output that has a constant bias voltage. The control of this high voltage DC output is typically done with a digital controlling circuit that is connected to a high power waveform modification circuit that uses components like thyristors or IGBJT's.

Figure 3:
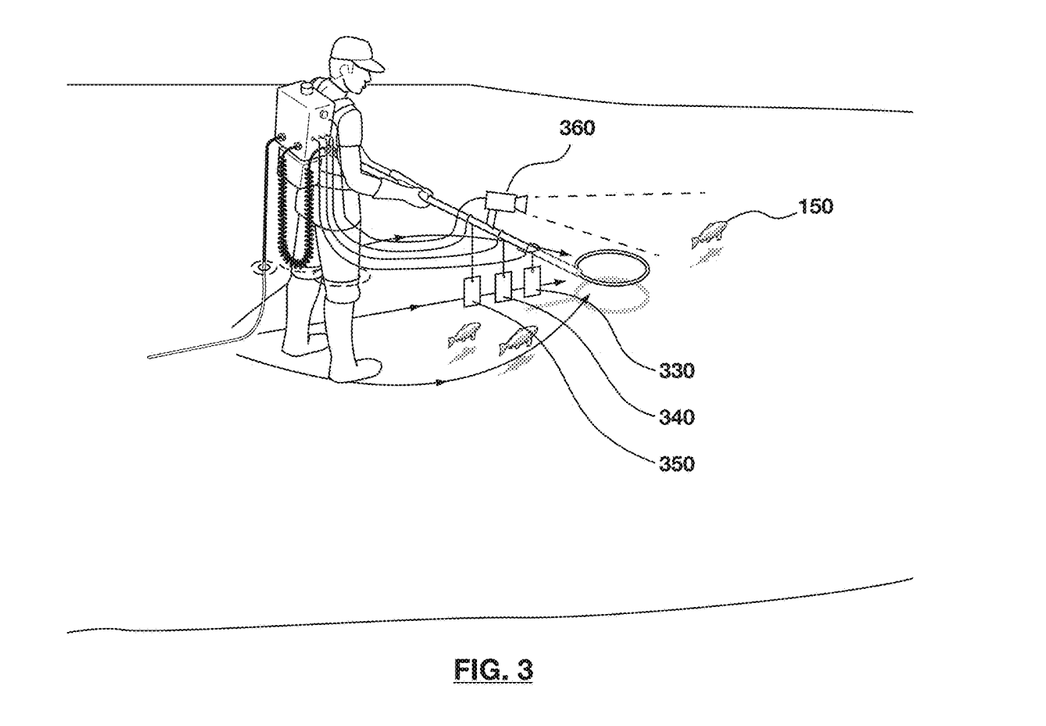
FIG. 3 is a diagram of one embodiment of the mobile electrofisher with the improved processing platform that includes a camera, an electric field meter, a temperature probe, and a conductivity probe.

Now referring to FIG. 3 which depicts the improved mobile electrofishing device. The improved mobile electrofishing device has three external sensors: a conductivity 330, a temperature 340, and an electric field probe 350 that is typically mounted to the anode pole 145 in a manner that they will be immersed in the water while the anode pole 145 is also immersed in the water. The conductivity 330, temperature 340, and electric field probes 350 are connected via electrical cables to the pulsator 250 (not shown) via a connection through the mobile electrofishing case.

Also mounted to the anode pole is a camera 360 that can capture the image of the fish 150 that is swimming near the anode 140. The image information is captured and transferred to the electrofisher. The image information may be transferred by an electrical cable connected from the camera 360. The data may also be transferred via fiber optic cable and/or wireless connection.

Figure 4:
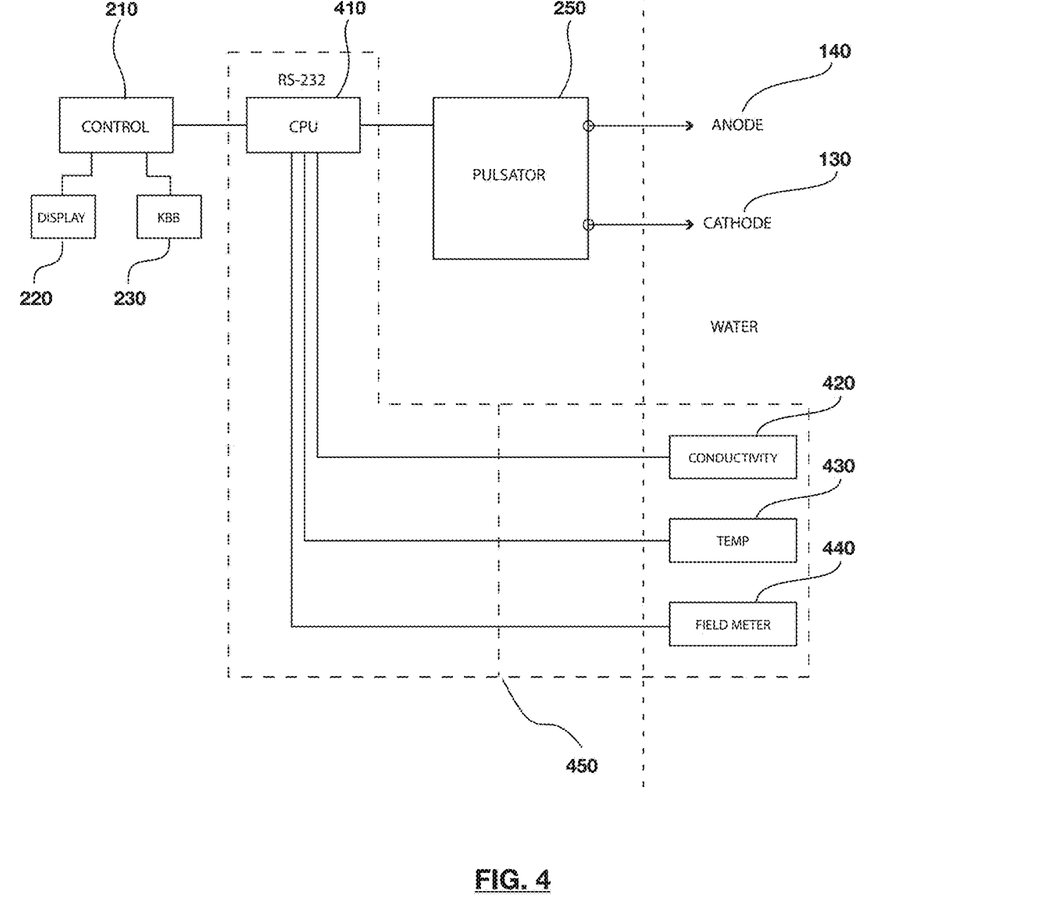
FIG. 4 is a functional block diagram of the improved mobile electrofisher.

Now referring to FIG. 4 which illustrates the functional block diagram of the improved mobile electrofisher. The pulsator 250 is connected to a monitor processor 410 that is placed between the prior art controller 210. The prior art controller 210 is connected to the display 220 and a keyboard 230.

The monitor processor 410 is further connected to a monitoring system 450. The monitoring system 450 has one or more of the following sensors, which includes, but is not limited to, the measurement of: electrical conductivity of the water 420; temperature of the water 430; and the electric field strength in the water 440. The monitoring system may also include other environmental monitoring sensors. The information from the monitoring system 450 can be used to adjust the operating parameters of the pulsator 250 by emulating the information between the controller 210 and the pulsator 250.

The monitoring processor 410 is further connected to the camera 360 (no shown). Further instrumentation can be a GPS.

Figure 5:
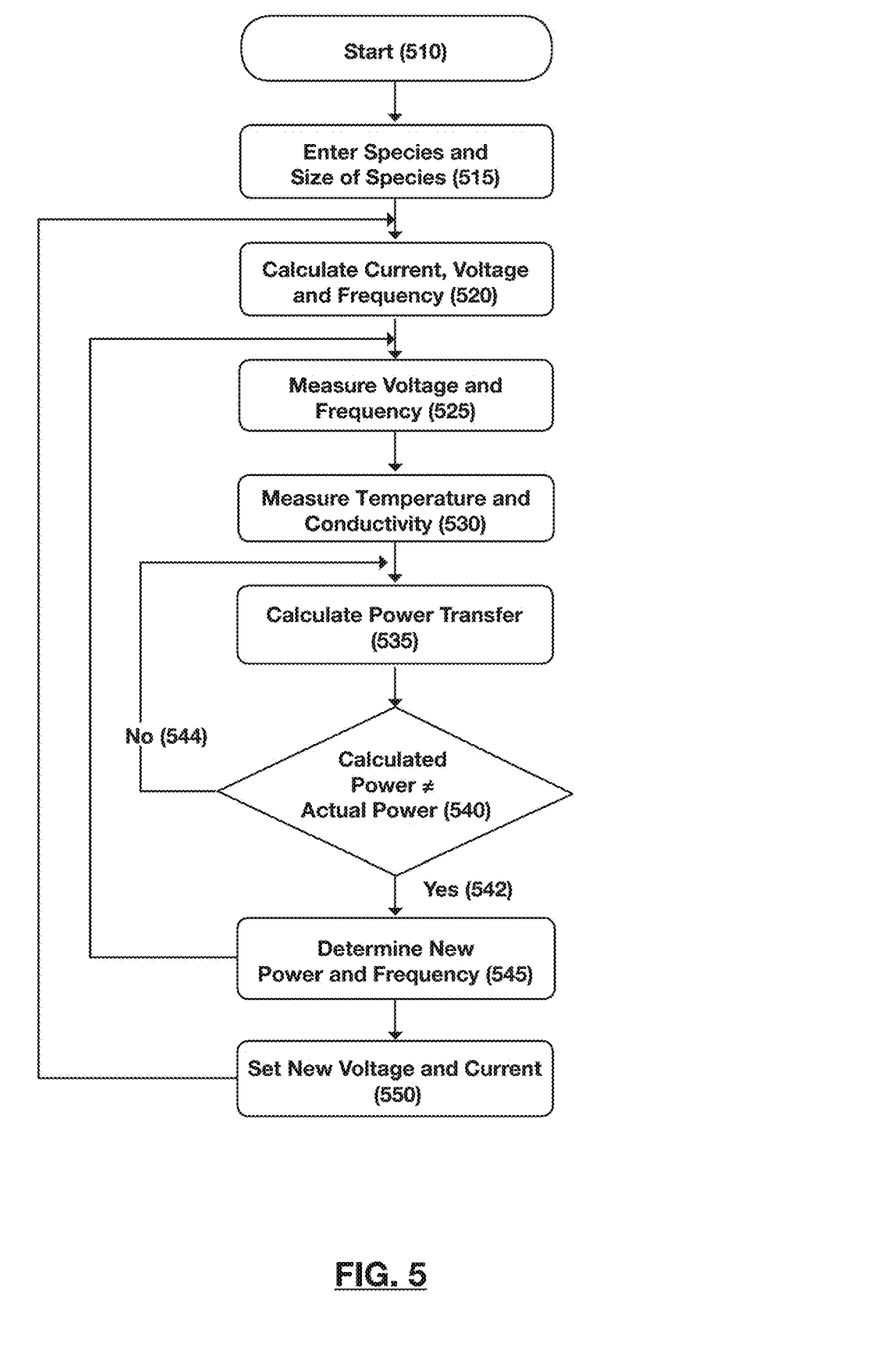
FIG. 5 is a flowchart of the operation of the preferred embodiment of the apparatus.

Now referring to FIG. 5 which depicts a flow chart of the interaction between the monitor processor 410, the monitoring system 450, and the control of the pulsator 250.

Upon startup or during operation, the operator enters the species and size of species 515 into the monitor processor 410. The monitor processor 410 calculates the current, voltage, and frequency 520 required to induce the physiological state into the fish. The monitoring system 450 then measures the voltage and frequency 525 induced into the water. The monitoring system 450 further measures the temperature and conductivity 530. From the measurements of the monitoring system 450 the calculated power transfer 535 to the fish is compared to the actual power 540. If there is a difference in value between the calculated and actual power, a new power and frequency 545 is set and a new voltage and current is set 550.

Figure 6:
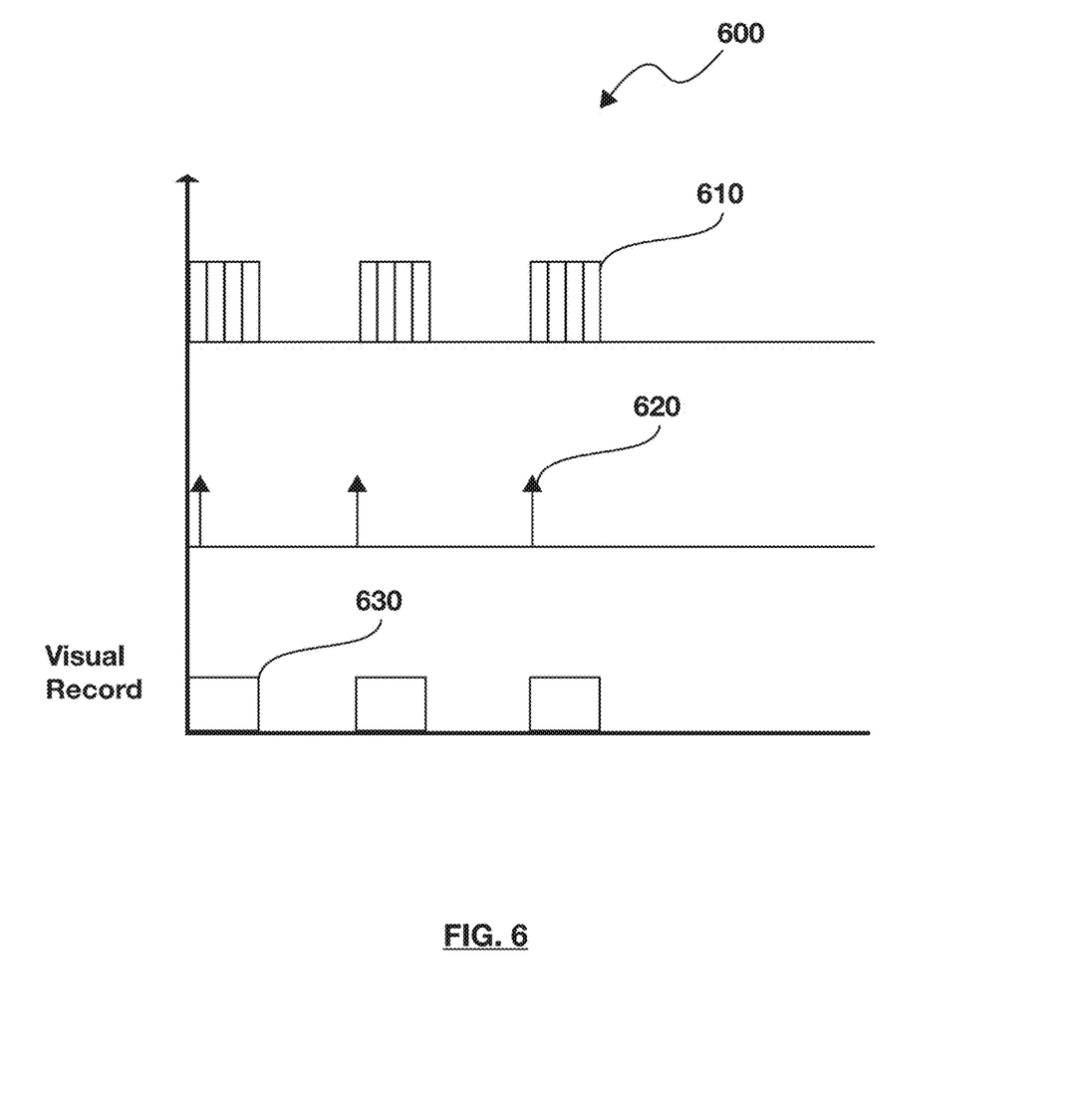
FIG. 6 is a timing diagram of the operation of the conductivity and temperature meters in view of pulsing.

Now referring to FIG. 6, the mobile electrofisher can store images 630 from the camera that mounted proximate to the anode, a digital image that may be synchronized with the electrofisher pulses. This image may be a single still image and/or sequential images (e.g. a movie). The image may further be processed by the monitor processor to indicate if a fish is proximate to the anode. Also the image may be processed so that if a fish is present, then the size of the fish is determined and recorded.

Figure 7:
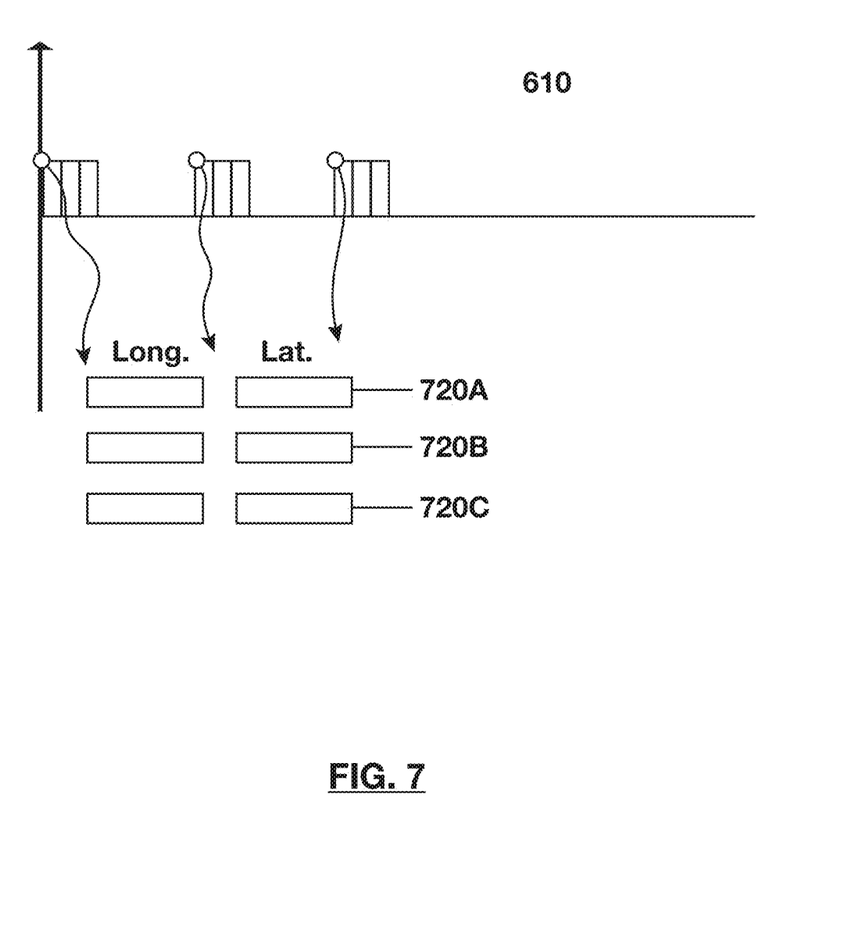
FIG. 7 is a timing diagram of the operation of the GPS.

Now referring to FIG. 7, the mobile electrofisher can store in the memory, coincident with each electofishing pulse, a longitude and latitude, and other additional information, such as the voltage, current, and pulse frequency settings. Also, the mobile electrofisher can store in memory, coincident with the pulses, the measured temperature, conductivity, and/or electric field at the anode.

For example, during traditional electrofishing the operator 110 will create a current between the rat-tail cathode and the anode. This will cause fish to swim towards the anode. The operator and/or her assistant will then capture and/or count the selected fish during operation. During electrofishing it may become necessary to adjust the voltage and/or current settings to compensate for changes in the temperature and/or conductivity of the water. The purpose of this adjustment is to ensure the fish have the same effect distributed across their bodies. Therefore the addition of the CPU connected to the current, temperature, and electric field measurement device allows for the adjustment of the electrofisher's current and/or voltage settings in response to these changes.

Now referring back to FIG. 3 and FIG. 4, one can recognize that an existing electrofisher that is configured as FIG. 1 and FIG. 2, may be ungraded by simply inserting the monitor processor 410 into the sensor and the monitoring system 450. This upgrade process may be less expensive than purchasing a new mobile electrofishing unit.

Those skilled in the art will recognize that various components described herein are available in a number of configurations. For example, the monitor processor 410 may be a single board computer, such as manufactured by TERN (www.tern.com), or a parallax (www.parallax.com). The single board computers can be programmed in any number of programming languages, including: C, BASIC, Python, PERL, and assembly languages.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

We claim:

1. A monitor processor controlled method of operationally modifying the operating parameters of an electrofisher by an operator to improve the electrofishing of a fish species in a body of water containing one or more fish species, including the steps of:

energizing the electrofisher via a pulsator controlled by a controller to generate a series of pulses so as to transfer an actual power to the body water;

inputting one or more details of the fish species into the monitor processor by the operator;

the monitor processor calculating a calculated power required for selectively inducing a desired physiological state in the fish species; wherein the desired physiological state is selected from a group consisting of electrotaxis, narcosis, tetanus and death;

monitoring by a monitoring system connected to the monitor processor, the actual power transferred in the body of water, by measuring one or more parameters from a group consisting of a voltage, a frequency of the series of pulses, a conductivity and a temperature of the body of water;

monitoring by a camera connected to the monitor processor, a proximity of the fish species between an anode and a cathode of the electrofisher via one or more digital images, wherein the camera is mounted to the anode of the electrofisher;

the monitor processor determining a difference between the calculated power and the actual power, the difference being used to adjust a current, the voltage, and the frequency of the series of pulses generated by the pulsator, controlled by the controller; so that a new power transferred to the fish species is optimized to attain the desired physiological state in the fish species; and the monitor processor synchronizing the one or more digital images with the series of pulses generated by the pulsator.

2. The method of operationally modifying the operating parameters of an electrofisher to improve electrofishing according to the steps in claim 1, further including:

optimizing the power transfer to avoid a change in the physiological state of the fish species.

3. The method of operationally modifying the operating parameters of an electrofisher to improve electrofishing according to the steps of claim 1 wherein: the electric field, the conductivity, and the temperature are measured with physical probes located proximate to the anode.

4. The method of operationally modifying the operating parameters of an electrofisher to improve electrofishing according to the steps of claim 1, further including a GPS.

5. The method of operationally modifying the operating parameters of an electrofisher to improve electrofishing according to the steps of claim 1, further wherein the images recorded by the camera can be still digital images or sequential digital images.

6. The method of operationally modifying the operating parameters of an electrofisher to improve electrofishing according to the steps of claim 1, further wherein the monitor processor can store in its memory longitude and latitude associated with each fish species.

7. The method of operationally modifying the operating parameters of an electrofisher to improve electrofishing according to the steps of claim 1, further wherein the digital image can be processed by the monitor processor to determine the size of a fish of the fish species.

* * * * *